(12) United States Patent
Liu et al.

(10) Patent No.: US 11,860,524 B2
(45) Date of Patent: Jan. 2, 2024

(54) PROJECTION DEVICE WITH HIGH COLOR PURITY

(71) Applicant: Coretronic Corporation, Hsin-Chu (TW)

(72) Inventors: Hung-Wei Liu, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/685,398

(22) Filed: Mar. 3, 2022

(65) Prior Publication Data

US 2022/0283484 A1 Sep. 8, 2022

(30) Foreign Application Priority Data

Mar. 4, 2021 (CN) .......................... 202110240066.8

(51) Int. Cl.
*G03B 21/20* (2006.01)
*G02B 27/10* (2006.01)
(Continued)

(52) U.S. Cl.
CPC ......... *G03B 21/206* (2013.01); *G02B 5/0284* (2013.01); *G02B 27/1006* (2013.01); *G03B 21/2033* (2013.01); *G03B 21/28* (2013.01)

(58) Field of Classification Search
CPC .. G03B 21/206; G03B 21/2033; G03B 21/28; G03B 21/2066; G03B 21/208;
(Continued)

(56) References Cited

U.S. PATENT DOCUMENTS

| 2019/0086779 A1* | 3/2019 | Chang .................. G02B 27/143 |
| 2019/0196315 A1* | 6/2019 | Pan ....................... G02B 5/0221 |

(Continued)

FOREIGN PATENT DOCUMENTS

| CN | 103809350 | 5/2014 |
| CN | 106412535 | 2/2017 |

(Continued)

OTHER PUBLICATIONS

"Office Action of China Counterpart Application", dated Feb. 4, 2023, p. 1-p. 11.

*Primary Examiner* — Magda Cruz
(74) *Attorney, Agent, or Firm* — JCIPRNET (57) ABSTRACT

Provided is a projection device including a laser light source, a wavelength conversion element having wavelength and non-wavelength conversion regions, a diffuser element having first and second regions, a filter element, a beam splitting element, a first light valve, a second light valve, and a projection lens. During simultaneous rotation of the diffuser element and the wavelength conversion element, the first and second regions correspond respectively to the wavelength and non-wavelength conversion regions. The filter element is disposed in the first region, filtering out a laser beam emitted by the laser light source. The beam splitting element guides first and second sub-beams in a first beam passing through the first region of the diffuser element and the filter element respectively to the first and second light valves, and guides a second beam passing through the second region of the diffuser element to one of the first and second light valves.

10 Claims, 9 Drawing Sheets

(51) Int. Cl.
*G02B 5/02* (2006.01)
*G03B 21/28* (2006.01)

(58) Field of Classification Search
CPC .... G03B 33/08; G03B 21/204; G02B 5/0284; G02B 27/1006; G02B 26/008
See application file for complete search history.

(56) References Cited

U.S. PATENT DOCUMENTS

| | | | |
|---|---|---|---|
| 2019/0227416 A1* | 7/2019 | Pan | G03B 21/2013 |
| 2019/0227418 A1* | 7/2019 | Chang | G03B 21/142 |
| 2020/0073219 A1* | 3/2020 | Chen | G02B 26/00 |
| 2020/0314396 A1* | 10/2020 | Fan | H04N 9/3152 |
| 2020/0363711 A1* | 11/2020 | Dai | G03B 21/208 |
| 2020/0371417 A1* | 11/2020 | Fan | G03B 21/2066 |
| 2021/0289180 A1* | 9/2021 | Fan | G03B 21/2066 |

FOREIGN PATENT DOCUMENTS

| | | |
|---|---|---|
| CN | 110058478 | 7/2019 |
| CN | 110058479 | 7/2019 |
| CN | 111208696 | 5/2020 |
| JP | 2014021223 | 2/2014 |
| TW | 201932967 | 8/2019 |

\* cited by examiner

PROJECTION DEVICE WITH HIGH COLOR PURITY

CROSS-REFERENCE TO RELATED APPLICATION

This application claims the priority benefit of China application serial no. 202110240066.8, filed on Mar. 4, 2021. The entirety of the above-mentioned patent application is hereby incorporated by reference herein and made a part of this specification.

BACKGROUND

Technical Field

The disclosure relates to an optical device, and particularly to a projection device.

Description of Related Art

Generally speaking, a laser projector emits a laser beam by a laser light source for exciting a phosphor material on a phosphor wheel to emit an excited beam (such as a yellow beam). In the laser projector, the laser beam and the excited beam further serve as an illumination beam. A light valve in the laser projector then converts the illumination beam into an image beam, and a projection lens projects the image beam onto a screen to form an image.

However, during light conversion of the phosphor material, the phosphor material cannot completely convert the laser beam into the excited beam. An unconverted portion of the laser beam and the yellow beam are transmitted to the light valve in a same time interval, resulting in color impurity of the image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device.

Other objectives and advantages of the disclosure may be further understood from the technical features disclosed herein.

In order to achieve one or a part or all of the above or other objectives, an embodiment of the disclosure provides a projection device including a laser light source, a wavelength conversion element, a diffuser element, a filter element, a beam splitting element, a first light valve, a second light valve, and a projection lens. The laser light source is configured to emit a laser beam. The wavelength conversion element is disposed downstream in an optical path of the laser light source, and the wavelength conversion element has a wavelength conversion region and a non-wavelength conversion region. The wavelength conversion region and the non-wavelength conversion region sequentially cut into a transmission path of the laser beam. The diffuser element is disposed downstream in an optical path of the wavelength conversion element. The diffuser element has a first region and a second region. The diffuser element and the wavelength conversion element rotate simultaneously, such that the first region and the second region correspond respectively to the wavelength conversion region and the non-wavelength conversion region during rotation. The filter element is disposed in the first region. The filter element is configured to filter out the laser beam. The beam splitting element is disposed downstream in an optical path of the filter element. The first light valve and the second light valve are disposed downstream in an optical path of the beam splitting element. The beam splitting element is configured to guide a first sub-beam and a second sub-beam in a first beam passing through the first region of the diffuser element and the filter element respectively to the first light valve and the second light valve, and the beam splitting element is configured to guide a second beam passing through the second region of the diffuser element to one of the first light valve and the second light valve. The projection lens is disposed downstream in an optical path of the first light valve and an optical path of the second light valve.

Based on the above, in the projection device of embodiments of the disclosure, the wavelength conversion region of the wavelength conversion element corresponds to the first region of the diffuser element, and the first region is disposed with the filter element which may filter out the laser beam, so a portion of laser beam not converted by a wavelength conversion substance is unlikely to be transmitted to the first light valve and the second light valve disposed downstream. Therefore, the projection device has good light purity.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
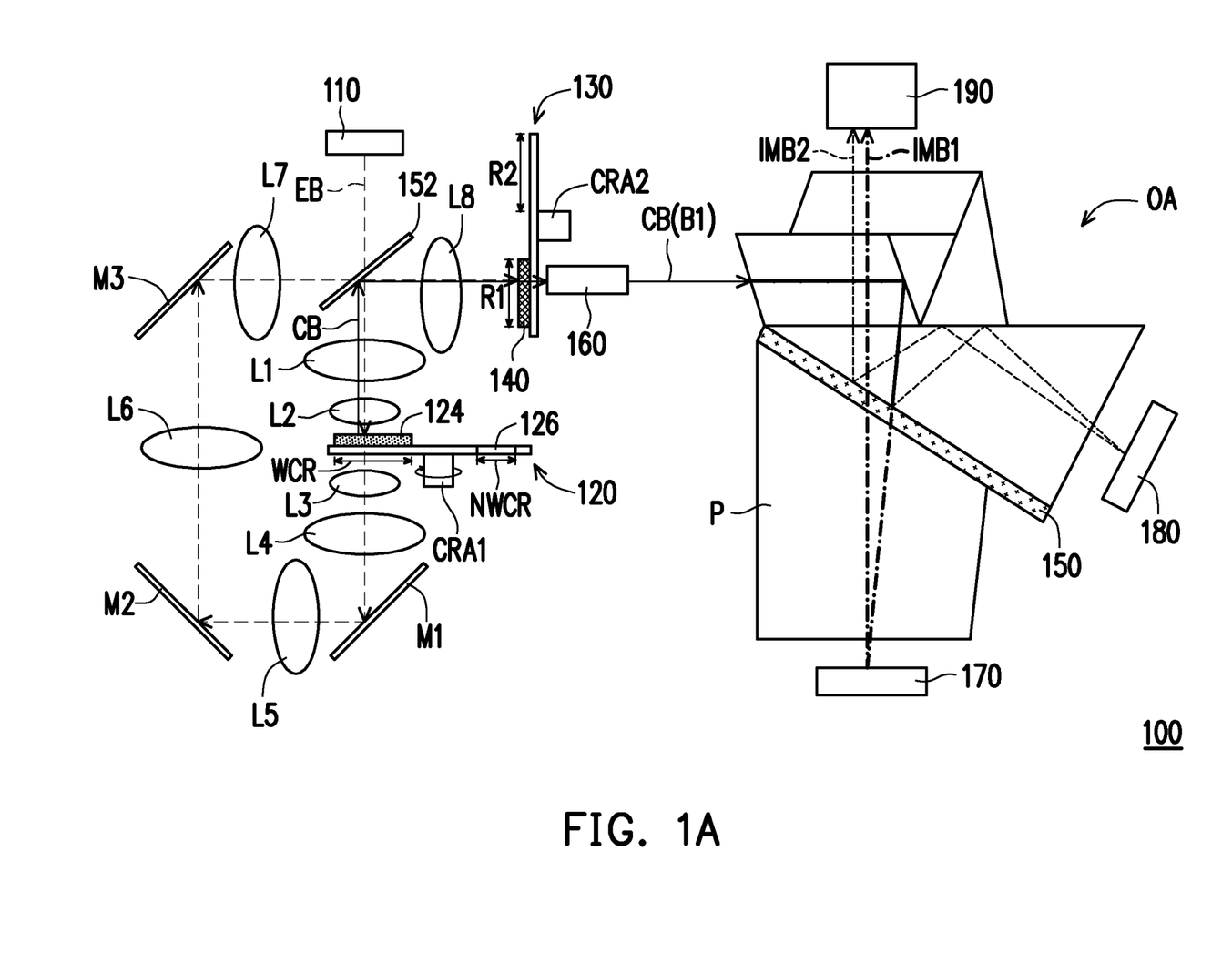
FIG. 1A and FIG. 1B are schematic views of optical paths in a first time interval and a second time interval, respectively, according to an embodiment of the disclosure.
Figure 1B:
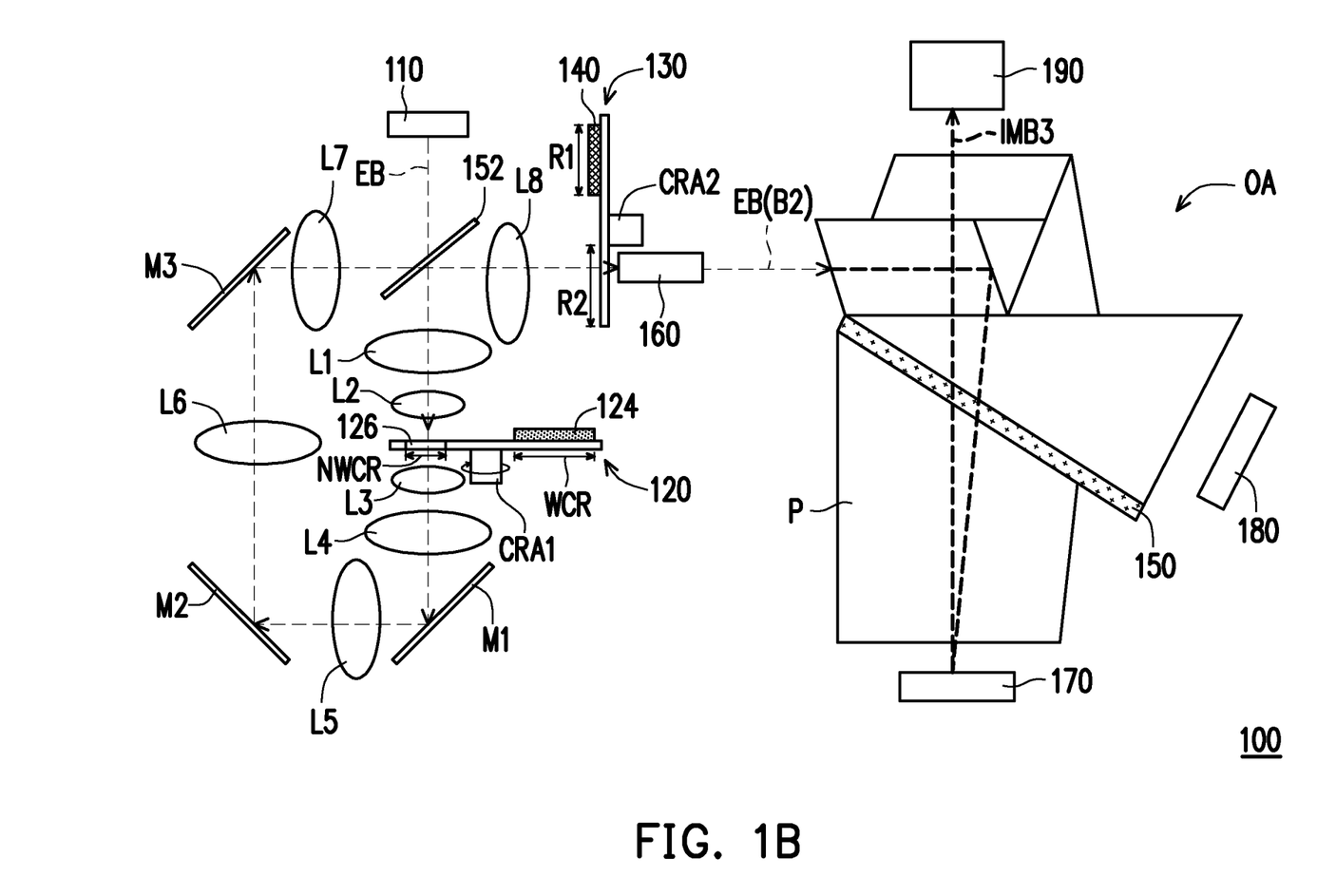
Figure 2:
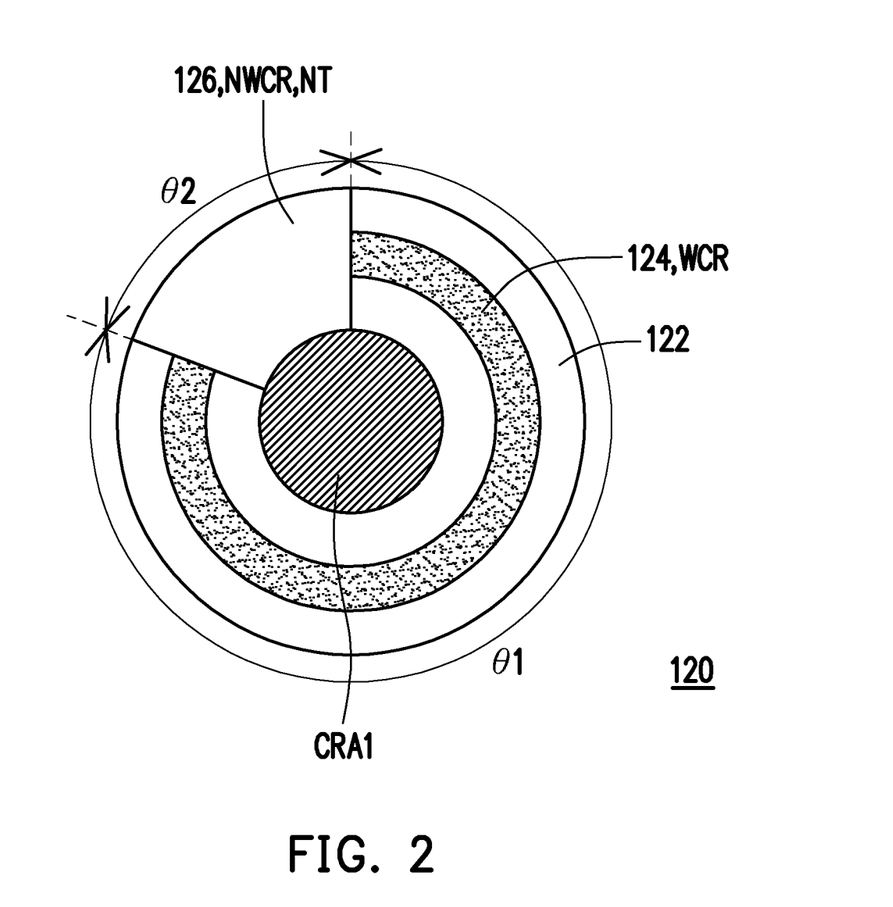
FIG. 2 is a schematic top view of a wavelength conversion element.
Figure 3:
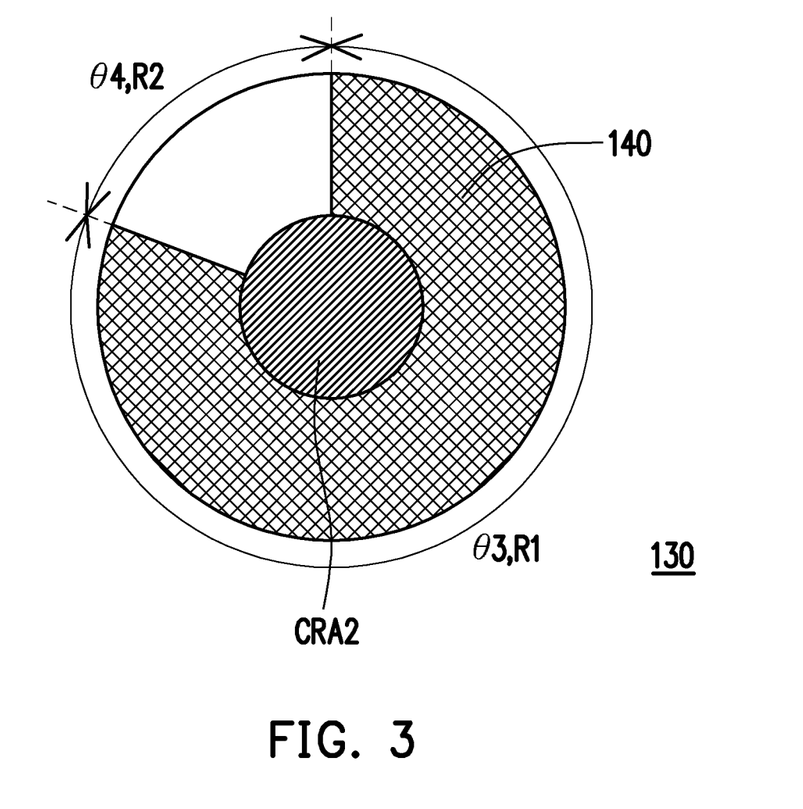
FIG. 3 is a schematic top view of a diffuser element.

FIG. 1A and FIG. 1B are schematic views of optical paths in a first time interval and a second time interval, respectively, according to an embodiment of the disclosure. FIG. 2 is a schematic top view of a wavelength conversion element. FIG. 3 is a schematic top view of a diffuser element.

With reference to FIG. 1A and FIG. 1B, in this embodiment, a projection device 100 includes a laser light source 110, a wavelength conversion element 120, a diffuser element 130, a filter element 140, beam splitting elements 150 and 152, a first light valve 170, a second light valve 180, and a projection lens 190. The above elements will be described in detail in the following paragraphs.

The laser light source 110 is configured to emit a laser beam EB, and is, for example but not limited to, a laser light emitting element, an array arranged by multiple laser light emitting elements, or an optical element assembly composed of one or more light emitting elements, mirrors, or lenses. A type of the laser light emitting element is, for example, a laser diode. In addition, a peak wavelength of a light spectrum of the laser beam EB, for example, falls within a wavelength range of blue light, and, for example but not limited to, falls within a range of 440 nanometers to 470 nanometers. The peak wavelength is defined as a wavelength corresponding to a maximum light intensity in a light intensity spectrum.

The wavelength conversion element 120 is configured to convert a beam passing through the wavelength conversion element 120 into a beam of different wavelengths (a conversion beam). With reference to FIG. 2, in this embodiment, the wavelength conversion element 120 includes a wavelength conversion region WCR and a non-wavelength conversion region NWCR. Specifically, the wavelength conversion element 120 has a rotary disc 122, a wavelength conversion substance 124, a light transmitting element 126, and a first central rotary axis CRA1. The rotary disc 122 is disposed with a notch NT, and the light transmitting element 126 is disposed in the notch NT. The wavelength conversion substance 124 is, for example, a photoluminescent material, such as a phosphor glue layer or a quantum dot, but the disclosure is not limited thereto. In this embodiment, the wavelength conversion substance 124 is, for example, a yellow phosphor glue layer. The light transmitting element 126 is embedded in the notch NT, and is composed of, for example but not limited to, a material having high light transmittance, such as glass. In this embodiment, the wavelength conversion substance 124 causes a photoluminescence phenomenon and emits a long-wavelength beam when irradiated by a short-wavelength beam (i.e., a wavelength conversion phenomenon). Therefore, a region where the wavelength conversion substance 124 is disposed defines the wavelength conversion region WCR, and the wavelength conversion substance 124 (or the rotary disc 122) is adapted to reflect a beam which has undergone wavelength conversion. A region defined by the light transmitting element 126 may be penetrated by a beam without wavelength conversion, so the light transmitting element 126 defines the non-wavelength conversion resign NWCR, which may also be referred to as a light penetration region. Therefore, an implementation of the wavelength conversion element 120 of this embodiment is, for example, a transmissive wavelength conversion element. The wavelength conversion region WCR and the non-wavelength conversion region NWCR are disposed around the first central rotary axis CRA1. The wavelength conversion region WCR has a first radian θ1 relative to the first central rotary axis CRA1, and the non-wavelength conversion region NWCR has a second radian θ2 relative to the first central rotary axis CRA1. The first radian θ1 is, for example, greater than the second radian θ2.

With reference to FIG. 3 as well, the diffuser element 130 of the projection device 100 is configured to diffuse/scatter the beam passing through this diffuser element, which is, for example, a diffuser wheel. The diffuser element 130 has a first region R1 and a second region R2. In this embodiment, the diffuser element 130 is disposed with a diffuser structure (not shown). For example, the first region R1 and the second region R2 are both disposed with the diffuser structures, for example but not limited to, on a surface of the diffuser element 130. In other embodiments, for example but not limited to, diffuser particles are disposed inside the diffuser element 130. The first region R1 and the second region R2 of the diffuser element 130 are different in that the first region R1 of the diffuser element 130 is further disposed with the filter element 140, whereas the second region R2 is not disposed with the filter element 140. Moreover, the diffuser element 130 has a second central rotary axis CRA2. The first region R1 and the second region R2 are disposed around the second central rotary axis CRA2. The first region R1 has a third radian θ3 relative to the second central rotary axis CRA2. The second region R2 has a fourth radian θ4. The third radian θ3 is, for example, greater than the fourth radian θ4. With reference to FIG. 2 and FIG. 3 together, the first radian θ1 is equal to the third radian θ3, and the second radian θ2 is equal to the fourth radian θ4.

Furthermore, the filter element 140 may filter out beams of wavelengths within a specific range and allow beams of wavelengths out of the specific range to pass through. In this embodiment, the filter element 140 is, for example, a blue light filter film, which may filter out blue light and allows beams of other wavelengths to pass through.

With reference to FIG. 1A and FIG. 1B, the beam splitting elements 150 and 152 refer to an optical element having a beam splitting function. In this embodiment, the beam splitting element is a dichroic mirror (DM) having wavelength selectivity or a dichroic film splitting beams by wavelength/color, but the disclosure is not limited thereto. In this embodiment, the beam splitting element 150 is designed to allow blue light and red light to penetrate and reflect green light. The beam splitting element 152 is designed to allow blue light to penetrate and reflect beams of other wavelengths, such as yellow light.

The projection device 100 may further include a light homogenizing element 160, which refers to an optical element homogenizing beams passing through the light homogenizing element 160. In this embodiment, the light homogenizing element 160 is, for example but not limited to, an integration rod, an array of lenses, or other optical elements having a light homogenizing function.

An optical prism assembly OA refers to an optical element including multiple prisms. In this embodiment, the optical prism assembly OA has a function of guiding beam transmission directions, and one prism in the optical prism assembly OA is denoted as P.

The light valves 170 and 180 refer to any one of spatial light modulators such as a digital micro-mirror device (DMD), a liquid-crystal-on-silicon (LCOS) panel, or a liquid crystal panel (LCD), but the disclosure is not limited thereto.

The projection lens 190 includes, for example, a combination of one or more optical lenses having a diopter, and the optical lenses, for example, are various combinations of non-planar lenses including biconcave lenses, biconvex lenses, concave-convex lenses, convex-concave lenses, plane-convex lenses, and plane-concave lenses. The disclosure does not limit the form and type of the projection lens 190.

In addition, in this embodiment, for facilitating adjustment of an optical path of the laser beam EB and/or a conversion beam CB, one to multiple mirrors M1 to M3 and lenses L1 to L8 may selectively be added inside the projection device 100, but the disclosure does not particularly limit the number and position of the mirrors and the lenses. The optical prism assembly OA includes multiple prisms, one of which is denoted as P.

Disposition relationship between the above elements and optical behaviors in the projection device 100 will be described in detail in the following paragraphs.

With reference to FIG. 1A and FIG. 1B, in this embodiment, the wavelength conversion element 120 is disposed downstream in an optical path of the laser light source 110. The diffuser element 130 is disposed downstream in an optical path of the wavelength conversion element 120. The optical prism assembly OA is disposed downstream in an optical path of the diffuser element 130 and is located between the diffuser element 130, the first light valve 170, and the second light valve 180. The beam splitting element 150 is disposed downstream in an optical path of the filter element 140, and is disposed on a surface of one prism P in the optical prism assembly OA by plating or coating. The beam splitting element 152 is disposed downstream in the optical path of the laser light source 110 and is disposed upstream in the optical path of the diffuser element 130. The light homogenizing element 160 is disposed in an optical path between the beam splitting element 150 and the diffuser element 130. The first light valve 170 and the second light valve 180 are disposed downstream in an optical path of the beam splitting element 150. The projection lens 190 is disposed downstream in an optical path of the first light valve 170 and an optical path of the second light valve 180.

In detail, during operation of the projection device 100, the wavelength conversion region WCR and the non-wavelength conversion region NWCR of the wavelength conversion element 120 sequentially cut into a transmission path of the laser beam EB. Moreover, the wavelength conversion element 120 and the diffuser element 130 rotate simultaneously, such that the first region R1 and the second region R2 correspond respectively to the wavelength conversion region WCR and the non-wavelength conversion region NWCR during rotation. That is, the wavelength conversion region WCR of the wavelength conversion element 120 and the first region R1 of the diffuser element 130 cut into a transmission path of a beam (for example, the laser beam EB and/or the conversion beam CB) at the same time.

With reference to FIG. 1A, in the first time interval, the wavelength conversion region WCR of the wavelength conversion element 120 and the filter element 140 disposed on the first region R1 cut into the transmission path of the laser beam EB, and the first region R1 of the diffuser element 130 and the filter element 140 disposed on the first region R1 cut into a transmission path of the conversion beam CB. Therefore, after the laser light source 110 emits the laser beam EB, the laser beam EB is sequentially transmitted to the beam splitting element 152 and the wavelength conversion substance 124 (descriptions of lenses and mirrors are omitted in the following embodiments). The wavelength conversion substance 124 is excited by most of the laser beam EB (approximately 99%) to generate the conversion beam CB. Since the wavelength conversion substance 124 is, for example, a yellow phosphor glue layer, a peak wavelength of the conversion beam CB, for example, falls within a wavelength range of yellow light. Next, the conversion beam CB is transmitted to the beam splitting element 152, the filter element 140, the diffuser element 130 (the first region R1), the light homogenizing element 160, the optical prism assembly OA, and the beam splitting element 150. The conversion beam CB, for example, penetrates the first region R1. The beam splitting element 150 splits the conversion beam CB passing through the first region R1 and the filter element 140 (as a first beam B1) into a first sub-beam CB1 (red beam) and a second sub-beam CB2 (green beam) having different peak wavelengths. In detail, the beam splitting element 150 may allow the first sub-beam CB1 in the conversion beam CB to penetrate and may reflect the second sub-beam CB2 in the conversion beam CB, thereby guiding the first sub-beam CB1 and the second sub-beam CB2 respectively to the first light valve 170 and the second light valve 180. The first light valve 170 converts the first sub-beam CB1 into a first image beam IMB1, and the second light valve 180 converts the second sub-beam CB2 into a second image beam IMB2. The first image beam IMB1 and the second image beam IMB2 are further guided to the projection lens 190 by the optical prism assembly OA, and then the projection lens 190 projects the first image beam IMB1 and the second image beam IMB2 onto a projection medium (such as a projection screen).

On the other hand, in the first time interval, after the laser beam EB is transmitted to the wavelength conversion element 120, there is still a small portion of the laser beam EB not converted by the wavelength conversion substance 124 (approximately 1%), so the small portion of the laser beam EB will be transmitted to the filter element 140. Since the filter element 140 is configured to filter out blue light, the laser beam EB in the first time interval may be filtered out and will not be transmitted to the first light valve 170 or the second light valve 180 disposed downstream.

With reference to FIG. 1B, in the second time interval, the non-wavelength conversion region NWCR (the light transmitting element 126) and the second region R2 of the diffuser element 130 cut into the transmission path of the laser beam EB at the same time. Therefore, after the laser light source 110 emits the laser beam EB, the laser beam EB is sequentially transmitted to the beam splitting element 152, the light transmitting element 126 (the non-wavelength conversion region NWCR), the beam splitting element 152, the diffuser element 130 (the second region R2), the light homogenizing element 160, the optical prism assembly OA, and the beam splitting element 150. The laser beam EB, for example, penetrates the light transmitting element 126, and is transmitted to and penetrates the second region R2. The beam splitting element 150 guides the laser beam EB passing through the second region R2 (as a second beam B2) to one of the first light valve 170 and the second light valve 180. In detail, the laser beam EB is transmitted to the first light valve 170 after penetrating the beam splitting element 150. The first light valve 170 converts the laser beam EB into a third image beam IMB3. The third image beam IMB3 is further guided to the projection lens 190 by the optical prism assembly OA, and then the projection lens 190 projects the third image beam IMB3 onto the projection medium.

Based on the above, in the projection device 100 of this embodiment, the wavelength conversion region WCR of the wavelength conversion element 120 corresponds to the first region R1 of the diffuser element 130, and the first region R1 is disposed with the filter element 140 which may filter out the laser beam EB, so the portion of the laser beam EB not converted by the wavelength conversion substance 122 is unlikely to be transmitted to the first light valve 170 and the second light valve 180 disposed downstream and thus affect color purity of images projected by the projection device 100. Therefore, the projection device 100 has good optical quality.

Note that the following embodiments use the reference numerals and part of the content of the above embodiment, and descriptions of the same technical content are omitted. For the descriptions of the omitted parts, please refer to the above embodiment. The descriptions will not be repeated in the following embodiments.

Figure 4A:
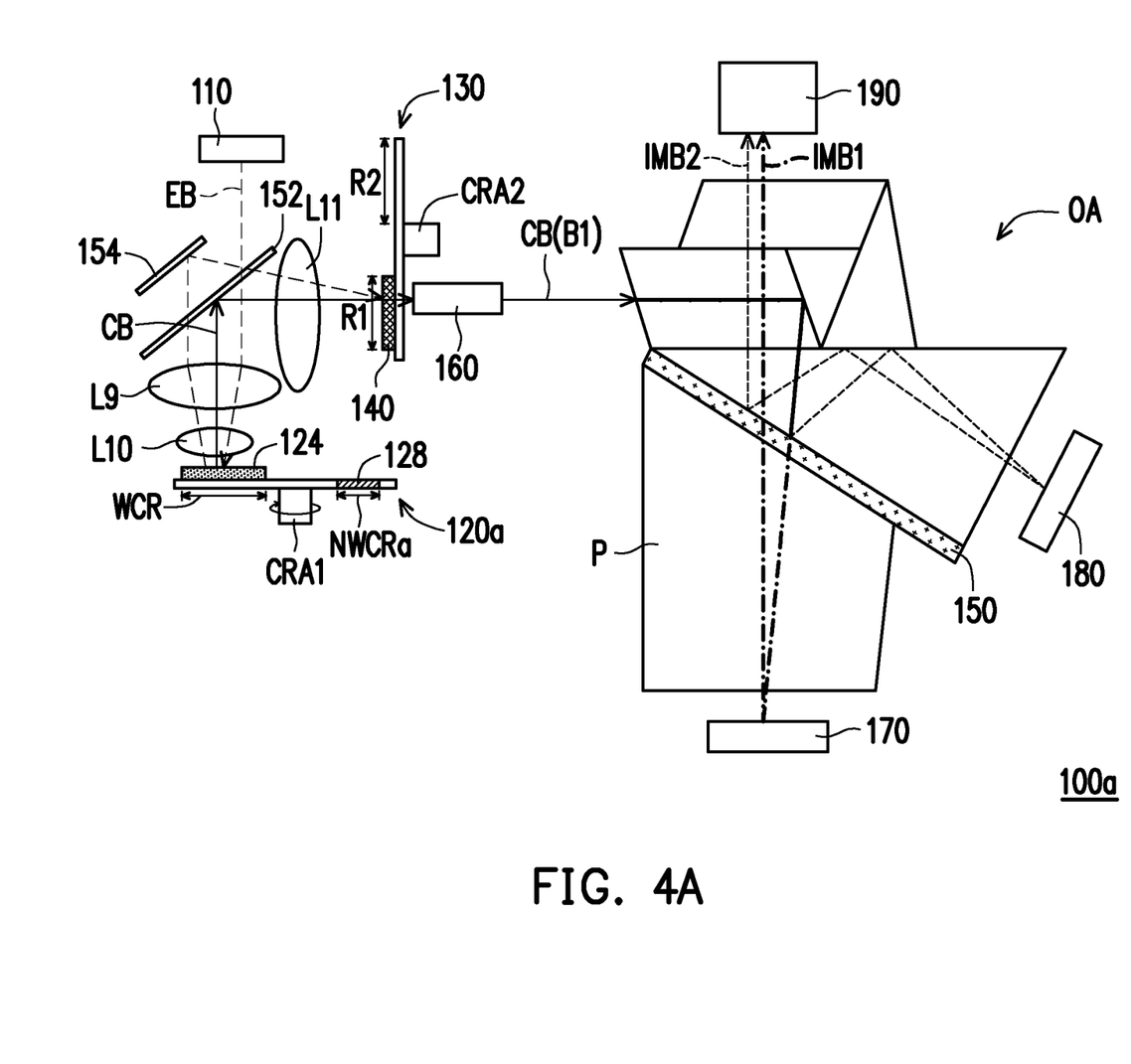
FIG. 4A and FIG. 4B are schematic views of optical paths in a first time interval and a second time interval, respectively, according to another embodiment of the disclosure.
Figure 4B:
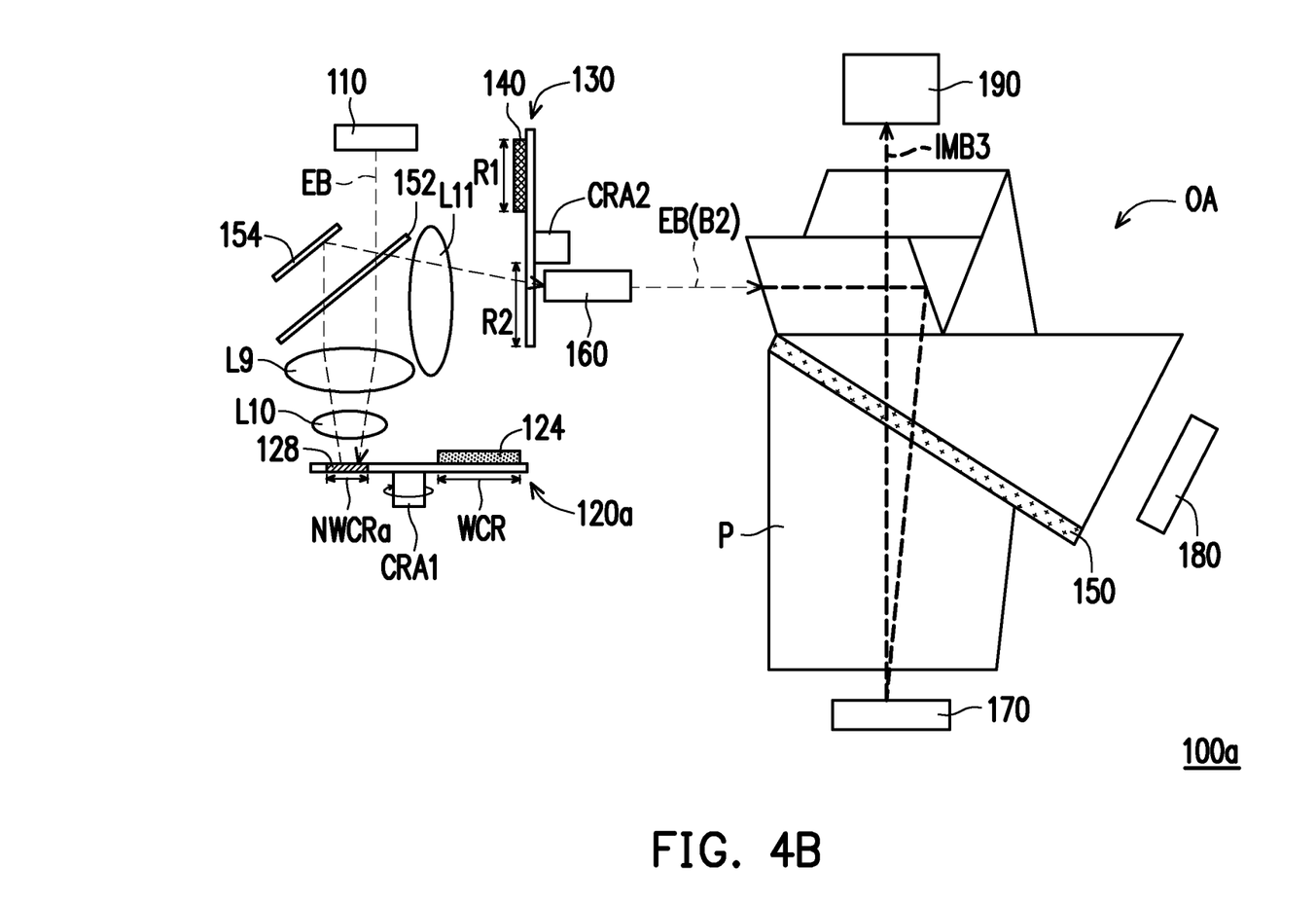
Figure 5:
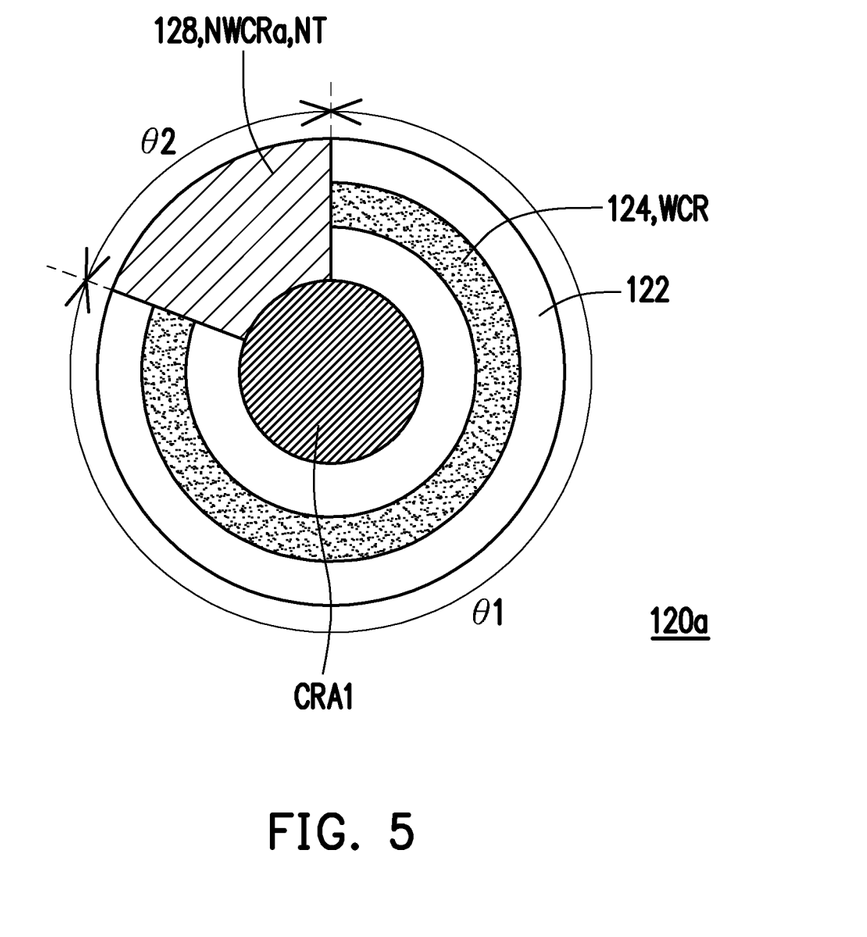
FIG. 5 is a schematic top view of a wavelength conversion element of another embodiment.

FIG. 4A and FIG. 4B are schematic views of optical paths in a first time interval and a second time interval, respectively, according to another embodiment of the disclosure. FIG. 5 is a schematic top view of a wavelength conversion element of another embodiment.

With reference to FIG. 4A and FIG. 4B, a projection device 100a in the embodiment of FIG. 4A and FIG. 4B is substantially similar to the projection device 100 of FIG. 1A and FIG. 1B. The two are mainly different in that the wavelength conversion elements are different. With reference to FIG. 5, in this embodiment, a non-wavelength conversion region NWCRa of a wavelength conversion element 120a includes a reflecting element 128. In other words, the non-wavelength conversion region NWCRa is defined by the reflecting element 128, and the reflecting element 128 is disposed in the notch NT of the rotary disc 122. With reference to FIG. 4A and FIG. 4B together, the projection device 100a further includes an optical element 154 disposed beside the beam splitting element 152. The optical element 154 is, for example but not limited to, a mirror. In other embodiments, the optical element 154 is, for example, a beam splitting element, configured to reflect the laser beam EB and allow other beams to penetrate. In this embodiment, the number of the lenses is greatly reduced to three, which are lenses L9 to L11. Therefore, the projection device 100a takes up a relatively small volume.

Optical behaviors in the projection device 100a will be described in detail in the following paragraphs.

With reference to FIG. 4A, in the first time interval, the wavelength conversion region WCR of the wavelength conversion element 120a cuts into the transmission path of the laser beam EB, and the first region R1 of the diffuser element 130 and the filter element 140 cut into the transmission path of the conversion beam CB. Therefore, after the laser light source 110 emits the laser beam EB, the laser beam EB is sequentially transmitted to the beam splitting element 152 and the wavelength conversion substance 124. Most of the laser beam EB is transmitted to and excites the wavelength conversion substance 124 to generate the conversion beam CB. Next, the conversion beam CB is sequentially transmitted to the beam splitting element 152, the filter element 140, the first region R1 of the diffuser element 130, the light homogenizing element 160, the optical prism assembly OA, and the beam splitting element 150. The subsequent optical path is similar to that described in the relevant paragraphs of FIG. 1A, and therefore will not be described herein.

On the other hand, in the first time interval, there is still a small portion of the laser beam EB not converted by the wavelength conversion substance 124. Therefore, after reflected by the wavelength conversion substance 124 (or the rotary disc 122), the small portion of the laser beam EB is sequentially transmitted to the beam splitting element 152, the optical element 154, the beam splitting element 152, and the filter element 140. The small portion of the laser beam EB will be filtered out by the filter element 140 and will not be transmitted to the first light valve 170 or the second light valve 180 disposed downstream.

With reference to FIG. 4B, in the second time interval, the non-wavelength conversion region NWCRa (the reflecting element 128) of the wavelength conversion element 120a and the second region R2 of the diffuser element 130 cut into the transmission path of the laser beam EB. Therefore, after the laser light source 110 emits the laser beam EB, the laser beam EB is sequentially transmitted to the beam splitting element 152, the reflecting element 128, the beam splitting element 152, the beam splitting element 154, the beam splitting element 152, the second region R2 of the diffuser element 130, the light homogenizing element 160, the optical prism assembly OA, and the beam splitting element 150. After reflected by the reflecting element 128, the laser beam EB is transmitted to and penetrates the second region R2. The subsequent optical path is similar to that described in the relevant paragraphs of FIG. 1B, and therefore will not be described herein.

Figure 6A:
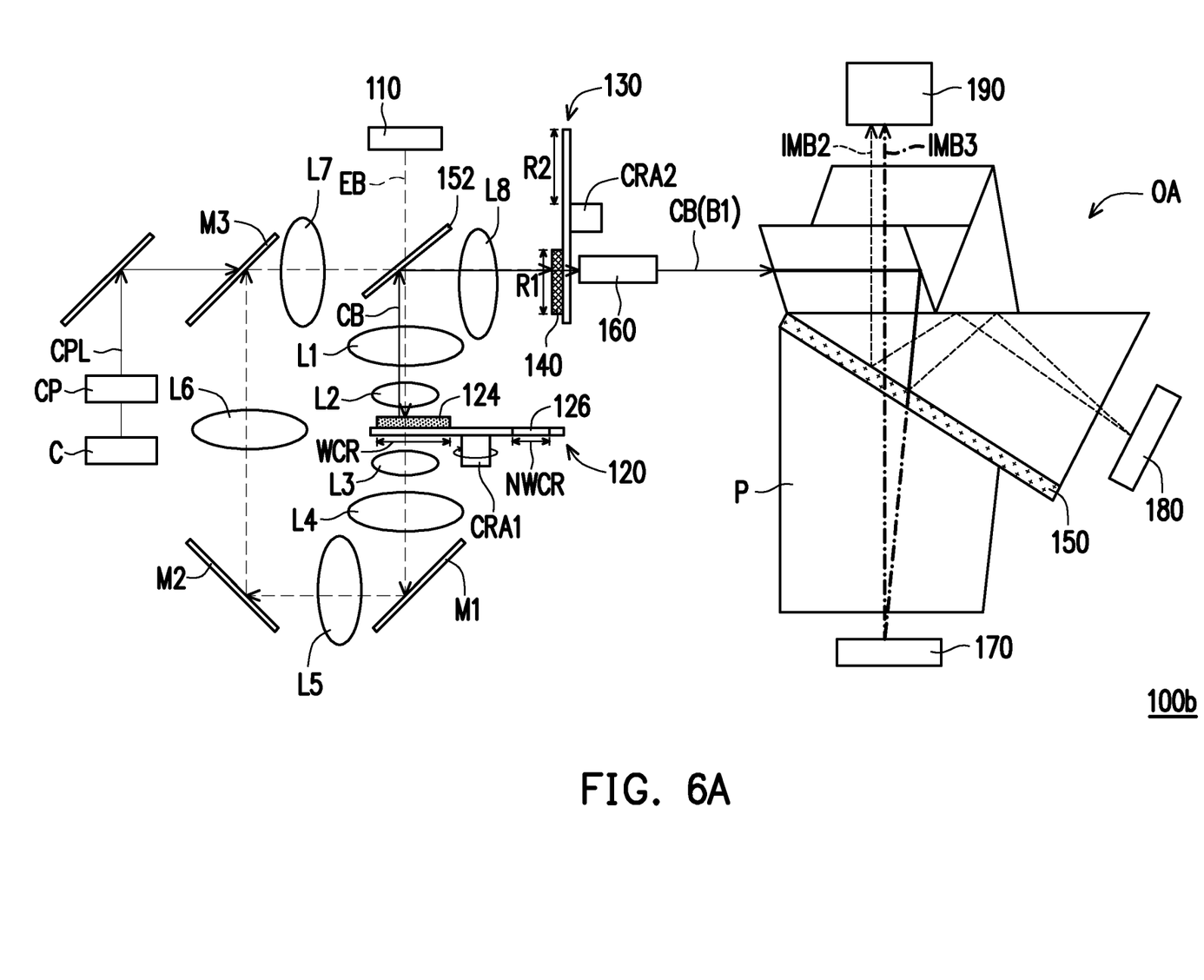
FIG. 6A and FIG. 6B are schematic views of optical paths in a first time interval and a second time interval, respectively, according to still another embodiment of the disclosure.
Figure 6B:
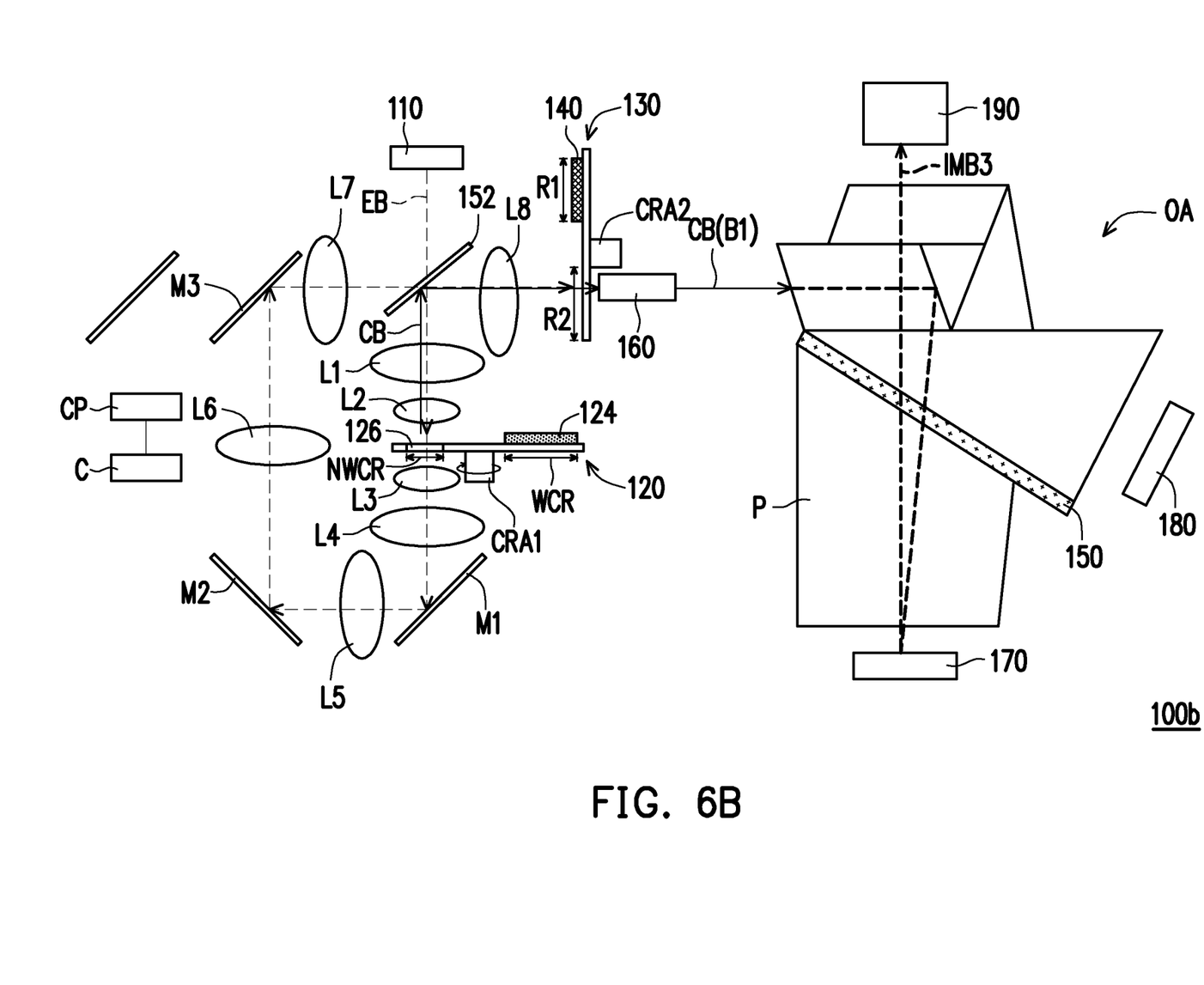

FIG. 6A and FIG. 6B are schematic views of optical paths in a first time interval and a second time interval, respectively, according to still another embodiment of the disclosure.

A projection device 100b in the embodiment of FIG. 6A and FIG. 6B is substantially similar to the projection device 100 of FIG. 1A and FIG. 1B. The two are mainly different in that the projection device 100b further includes a complementary light source CP configured to emit a complementary color beam CPL. The complementary light source CP is disposed upstream in the optical path of the beam splitting element 150. In this embodiment, the complementary light source CP is, for example, a red light source, and a peak wavelength of the complementary color beam CPL, for example, falls within a wavelength range of red light. In addition, the projection device 100b further includes a controller C configured to control whether the complementary light source CP emits the beam.

Optical behaviors in the projection device 100b will be described in detail in the following paragraphs.

With reference to FIG. 6A, an optical path in the first time interval is similar to that described in the relevant paragraphs of FIG. 1A, and therefore will not be described herein. The two are mainly different in that the controller C controls the complementary light source CP to emit the complementary color beam CPL in the first time interval. The complementary color beam CPL is guided to the beam splitting element 150 by the optical prism assembly OA. The beam splitting element 150 guides the complementary color beam CPL to one of the first light valve 170 and the second light valve 180. For example, since the complementary color beam CPL is a red beam, it may penetrate the beam splitting element 150, be transmitted to the first light valve 170 together with the first sub-beam CB1, and thereby be converted into the first image beam IMB1 together by the first light valve 170. Hence, light intensity of the first image beam IMB1 is intensified. It should be noted that in this embodiment, the optical element M3, for example but not limited to, may allow the complementary color beam CPL to penetrate and may reflect beams of other wavelengths.

With reference to FIG. 6B, an optical path in the second time interval is similar to that described in the relevant paragraphs of FIG. 1B, and therefore will not be described herein. The controller C controls the complementary light source CP not to emit the complementary color beam CPL in the second time interval.

Note that the complementary light source CP and the complementary color beam CPL are exemplified by a red light source and a red beam, but people skilled in the art may change a color of light emitted by the complementary light source according to design requirements. For example, in another embodiment, the complementary light source CP may be a green light element, and the complementary color beam CPL emitted by the complementary light source CP may be a green beam, but the disclosure is not limited thereto.

In summary, in the projection device of embodiments of the disclosure, the wavelength conversion region of the wavelength conversion element corresponds to the first region of the diffuser element, and the first region is disposed with the filter element which may filter out the laser beam, so the laser beam not converted by the wavelength conversion substance is unlikely to be transmitted to the first light valve and the second light valve disposed downstream. Therefore, the projection device has good light purity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device comprising a laser light source, a wavelength conversion element, a diffuser element, a filter element, a beam splitting element, a first light valve, a second light valve, and a projection lens,
    wherein the laser light source is configured to emit a laser beam;
    the wavelength conversion element is disposed downstream relative to the laser light source, and the wavelength conversion element has a wavelength conversion region and a non-wavelength conversion region, wherein the wavelength conversion region and the non-wavelength conversion region sequentially cut into a transmission path of the laser beam;
    the diffuser element is disposed downstream relative to the wavelength conversion element, the diffuser element has a first region and a second region, and the diffuser element and the wavelength conversion element rotate simultaneously, such that the first region and the second region correspond respectively to the wavelength conversion region and the non-wavelength conversion region during rotation;
    the filter element is disposed in the first region, wherein the filter element is configured to filter out the laser beam;
    the beam splitting element is disposed downstream relative to the filter element; and
    the first light valve and the second light valve are disposed downstream relative to the beam splitting element,
    wherein the beam splitting element is configured to guide a first sub-beam and a second sub-beam in a first beam passing through the first region of the diffuser element and the filter element respectively to the first light valve and the second light valve, and the beam splitting element is configured to guide a second beam passing through the second region of the diffuser element to one of the first light valve and the second light valve; and
    wherein the projection lens is disposed downstream relative to the first light valve and second light valve.

2. The projection device according to claim 1, wherein in a first time interval, the wavelength conversion region, the first region of the diffuser element, and the filter element cut into the transmission path of the laser beam, the wavelength conversion region emits a conversion beam after excited by the laser beam, and the conversion beam is transmitted to the first region and the filter element, wherein the conversion beam penetrating the first region serves as the first beam;

in a second time interval, the non-wavelength conversion region and the second region of the diffuser element cut into the transmission path of the laser beam, and the laser beam is sequentially transmitted to the non-wavelength conversion region and the second region, wherein the laser beam penetrating the second region serves as the second beam.

3. The projection device according to claim 2, wherein the non-wavelength conversion region comprises a reflecting element, and the laser beam is transmitted to the second region after reflected by the reflecting element in the second time interval.

4. The projection device according to claim 2, wherein the non-wavelength conversion region comprises a light transmitting element, and the laser beam is transmitted to the second region after penetrating the light transmitting element in the second time interval.

5. The projection device according to claim 1, wherein the wavelength conversion element has a first central rotary axis, the wavelength conversion region and the non-wavelength conversion region are disposed around the first central rotary axis, the wavelength conversion region has a first radian, and the non-wavelength conversion region has a second radian;

the diffuser element has a second central rotary axis, the first region and the second region are disposed around the second central rotary axis, the first region has a third radian, and the second region has a fourth radian, wherein the first radian is equal to the third radian, and the second radian is equal to the fourth radian.

6. The projection device according to claim 1, wherein the first region and the second region are disposed with a diffuser structure.

7. The projection device according to claim 1, wherein the projection device further comprises a complementary light source configured to emit a complementary color beam, and the complementary light source is disposed upstream relative to the beam splitting element, wherein the beam splitting element guides the complementary color beam to one of the first light valve and the second light valve.

8. The projection device according to claim 1, wherein the projection device further comprises an optical prism assembly disposed downstream relative to the diffuser element and located between the diffuser element, the first light valve, and the second light valve, wherein the beam splitting element is disposed on a surface of one prism in the optical prism assembly.

9. The projection device according to claim 1, wherein the wavelength conversion region comprises a wavelength conversion substance.

10. The projection device according to claim 1, wherein the projection device further comprises a light homogenizing element located between the beam splitting element and the diffuser element.

* * * * *